(12) United States Patent
Arnold et al.

(10) Patent No.: US 7,007,780 B2
(45) Date of Patent: Mar. 7, 2006

(54) VARIABLE SPEED CLUTCH

(75) Inventors: Joseph E. Arnold, Lindstrom, MN (US); Ted Perron, White Bear Township, MN (US); John Kossett, Vadnais Heights, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 104 days.

(21) Appl. No.: 10/826,511

(22) Filed: Apr. 16, 2004

(65) Prior Publication Data

US 2005/0230210 A1    Oct. 20, 2005

(51) Int. Cl.
*F16H 3/06* (2006.01)
*F16D 13/08* (2006.01)
*F16D 21/04* (2006.01)

(52) U.S. Cl. .................... 192/21; 192/48.2; 192/48.92; 192/51; 192/81 C; 192/84.6; 192/84.81; 74/355; 74/724

(58) Field of Classification Search ............... 192/84.6, 192/84.81; 74/724
See application file for complete search history.

(56) References Cited

U.S. PATENT DOCUMENTS

| | | | |
|---|---|---|---|
| 3,125,889 A | | 3/1964 | Perryman |
| 3,304,793 A | * | 2/1967 | Nishimura .................... 74/368 |
| 5,186,285 A | | 2/1993 | Van der Werff |
| 5,918,716 A | * | 7/1999 | Arcaro ..................... 192/84.81 |
| 6,681,909 B1 | * | 1/2004 | Cox ............................ 192/26 |

OTHER PUBLICATIONS

Yakovlev, V. A., "Electromagnetically Controlled Friction Reversible Coupling-with Ring Magneto-Conductor and Field Magnet," pp. 1, (Apr. 1976) (English Abstract Provided).

* cited by examiner

*Primary Examiner*—Richard M. Lorence
(74) *Attorney, Agent, or Firm*—Dicke, Billig & Czaja, PLLC

(57) ABSTRACT

A variable speed slip clutch is provided. The clutch has an output shaft, a first and second input hub, and output hub, a wrap spring and a control hub. In one embodiment, the clutch includes a source coupler coupled to a first and a second input drive. The output shaft is configured to rotate. The first input hub is coupled to the first input drive and configured to rotate about the output shaft in a first direction. The second input hub is coupled to the second input drive and configured to rotate about the output shaft in a second direction opposite the first direction. The output hub fixed to the output shaft and configured to rotate therewith. The wrap spring has a first and a second end. The first end of the wrap spring is fixed to the output hub such that the first end of the wrap spring rotates with rotation of the output hub. The control hub is coupled to the second end of the wrap spring. In one embodiment a control motor is provided and coupled to the control hub. The motor is configured to alternatively rotate the control hub in the first and second directions. Rotation of the control hub in the first direction causes the wrap spring to wrap open thereby engaging the second input hub. Rotation of the control hub in the second direction causes the wrap spring to wrap down thereby engaging the first input hub.

21 Claims, 3 Drawing Sheets

US 7,007,780 B2

VARIABLE SPEED CLUTCH

BACKGROUND

The present invention relates to a wrap spring clutch. The wrap spring clutch is variably controlled to provide a variable speed output.

A wrap spring clutch is a well-known mechanism for alternately transferring rotation from an input rotation source to some output and then detaching the source of input rotation from the output. Essentially, the wrap spring clutch includes an input, and an output with a wrap spring coupled between them. The wrap spring is wrapped open or wrapped down to alternatively connect and disconnect the input to the output, thereby engaging and disengaging the clutch. Typically, when the clutch is engaged the output rotates with the input rotational speed and is dependant on the input speed. It would be useful to have a simple wrap spring clutch design with an output rate of rotation that can be controlled independent of the rate of input rotation.

SUMMARY

The present invention is a variable speed slip clutch. The clutch has an output shaft, a first and second input hub, and output hub, a wrap spring and a control hub. In one embodiment, the clutch includes a source coupler coupled to a first and a second input drive. The output shaft is configured to rotate. The first input hub is coupled to the first input drive and configured to rotate about the output shaft in a first direction. The second input hub is coupled to the second input drive and configured to rotate about the output shaft in a second direction opposite the first direction. The output hub fixed to the output shaft and configured to rotate therewith. The wrap spring has a first and a second end. The first end of the wrap spring is fixed to the output hub such that the first end of the wrap spring rotates with rotation of the output hub. The control hub is coupled to the second end of the wrap spring. In one embodiment a control motor is provided and coupled to the control hub. The motor is configured to alternatively rotate the control hub in the first and second directions. Rotation of the control hub in the first direction causes the wrap spring to wrap open thereby engaging the second input hub. Rotation of the control hub in the second direction causes the wrap spring to wrap down thereby engaging the first input hub.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
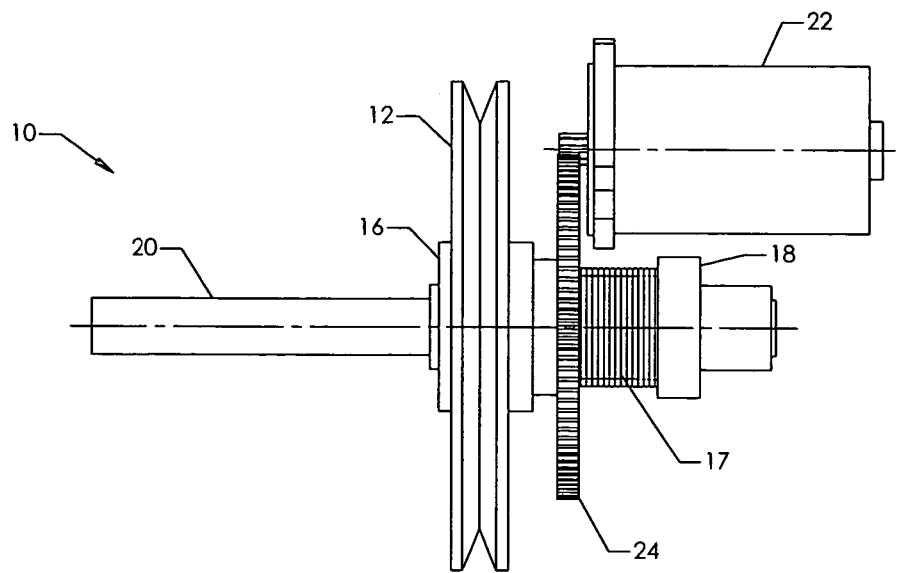
FIG. 1 illustrates a variable speed clutch in accordance with the present invention.
Figure 2:
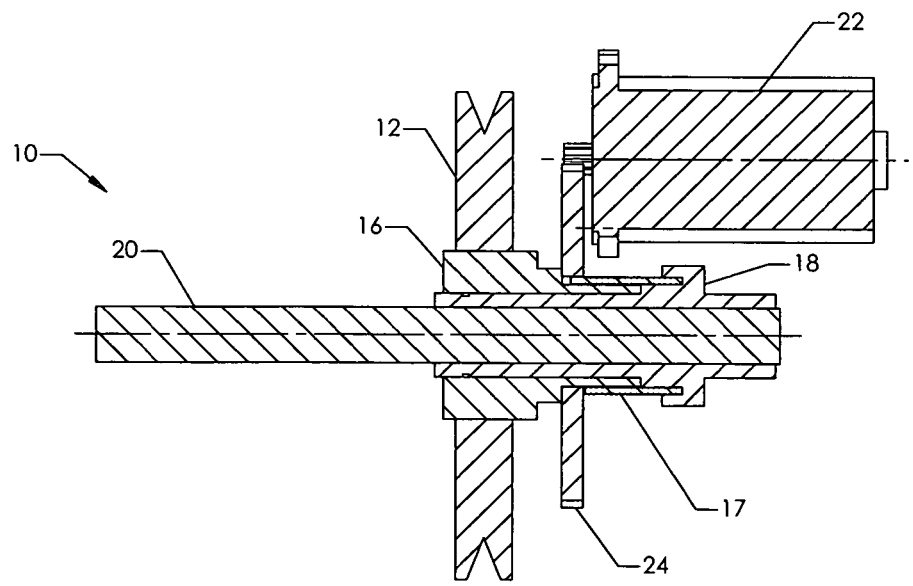
FIG. 2 illustrates a cross-sectional view of the variable speed clutch in accordance with the present invention.

FIGS. 1 and 2 illustrate a variable speed clutch 10 in accordance with the present invention. FIG. 2 illustrates a cross-section of variable speed clutch 10. Variable speed clutch 10 includes input pulley 12, input hub 16, wrap spring 17, output hub 18, output shaft 20, speed control motor 22, and speed control gear 24. Wrap spring 17 has a control end coupled to speed control gear 24 and an output end fixed to output hub 18. When a source of input rotation of a given speed is attached to input pulley 12, the speed of the rotation of output shaft 20 may be varied from some minimum speed up to the given input rotation speed by variably controlling the control end of wrap spring 17 within variable speed clutch 10. In this way, variable speed clutch 10 is conveniently operable to generate a controllable variable output speed.

In operation, input pulley 12 is coupled to a source of input rotation, such as a drive shaft coupled to a motor, an internal combustion engine or such similar source. A belt or other means is then coupled between the drive shaft and input pulley 12. The speed of the input rotation may be variable, but in one embodiment is relatively stable for a given motor speed or engine RPM. Input pulley 12 then rotates at this relatively fixed input speed. Input pulley 12 is coupled to input hub 16 such that it rotates at the same relative speed. Input hub 16 and output hub 18 are not directly fixed together, but rather communicate through wrap spring 17 with the intervention of speed control motor 22 and speed control gear 24.

Wrap spring 17 has a control end and an output end and is configured to be wound concentrically around both input hub 16 and output hub 18. The output end of wrap spring 17 is coupled to output hub 18 and the control end is coupled to speed control gear 24. Wrap spring 17 can be coupled to output hub and to speed control gear 24 in a variety of ways consistent with the present invention. For instance, wrap spring 17 may be press fit, welded, or bent and tucked into output hub and speed control gear 24, or some similar means of connection.

In one embodiment, wrap spring 17 has an equilibrium state with an internal diameter that is greater than the external diameter of input hub 16 so that input hub 16 will freely rotate within wrap spring 17 in this state. In this way, neither wrap spring 17 nor output shaft 20 will rotate due to the rotation of input hub 16 in this state. In other words, output shaft 20 can "free wheel" within variable speed clutch 10 when wrap spring 17 has an equilibrium state. When wrap spring 17 is caused to wrap down onto input hub 16, however, input hub 16, wrap spring 17 and output hub 18 will all rotate together. Thus, output shaft 20 will rotate at the input rotation speed of the source of input rotation.

As indicated, one embodiment of wrap spring 17 has an equilibrium state where there is no interference between wrap spring 17 and input hub 16. It also has a fully wrapped down state, where there is interference between wrap spring 17 and input hub 16 such that they rotate together. In addition to these two states of wrap spring 17, it can also be partially wrapped down such that there is variable slippage between wrap spring 17 and input hub 16. In these conditions of variable slippage, wrap spring 17, output hub 18, and thus output shaft 20, will rotate responsively to the rotation of input hub 16, but not at the same rate as input hub 16. Rather, because there is some slippage between wrap spring 17 and input hub 16 in this partially wrapped down condition, output hub 18, and thus output shaft 20, will rotate at the speed of the speed control gear 24.

Thus, the variability of the speed of rotation of output shaft 20 for variable speed clutch 10 is controlled by controlling the relative rate of rotation of speed control gear 24 and input hub 16. In one embodiment, the rate of rotation of input hub 16 is relatively constant such that the variability of the speed of rotation of output shaft 20 is accomplished by speed control gear 24 and speed control motor 22. Speed control gear 24 is coupled to, and thus acts upon, wrap spring 17. Speed control gear 24 is also coupled to the output of speed control motor 22. Speed control gear 24 rotates at a speed that is controlled by the output of speed control motor 24. In one embodiment, speed control motor 22 is a small DC motor.

Speed control gear 24 acts upon wrap spring 17 and causes wrap spring 17 to variably wrap down on, and wrap open off, input hub 16. With the present invention, the speed of speed control gear 24 is varied to variably affect the amount of slippage between wrap spring 17 and input hub 16. With the present invention, the amount of slippage varies from the condition where speed control gear 24 is stationary and not rotating so that wrap spring 17 is not wrapped down and input hub 16 freely rotates within wrap spring 17 to the condition where speed control gear 24 is rotating at its maximum speed, which matches the speed of rotation of input hub 16 so the wrap spring 17 is fully wrapped down onto, and rotating with, input hub 16.

When speed control motor 22 is not rotating, speed control gear 24 will be stationary. In this case, wrap spring 17 will be in a relaxed state, and therefore, will not be in interference with input hub 16 and will not rotate therewith. As the speed of speed control motor 22 increases from this condition, the rotational speed of speed control gear 24 also increases. This increased speed of rotation of speed control gear 24 causes wrap spring 17 to wrap down onto input hub 16 as the speed of rotation on speed control gear approaches the speed of rotation of input pulley 12 and input hub 16. At lower rotational speed for speed control gear 24, wrap spring 17 will slip relative to input hub 16. In this way, output hub 18 and output shaft 20 rotate at a slower rate than input pulley 12 and input hub 16 due to the slippage between wrap spring 17 and input hub 16. As the speed of rotation of speed control gear 24 continues to increase, so does the speed of rotation of output shaft 20. Eventually, when the speed of rotation of speed control motor 22 and speed control gear equals the speed of rotation of input pulley 12 and input hub 16, there is no longer slippage between wrap spring 17 and input hub 16, and output hub 18 and thus output shaft 20 will rotate with input pulley 12 and input hub 16.

Thus, by controlling the speed of speed control motor 22, the input rotation of input pulley 12 can be variably output to output shaft 20. Consequently, output shaft 20 can be controlled to be driven to rotate as the same speed as input pulley 12 down to where it is stationary and not driven to rotate at all. In one embodiment of clutch 10, the speed of rotation of output shaft 20 equals the speed of rotation of speed control gear 24. For example, if speed control gear 24 is stationary then output shaft 20 is stationary and if speed control gear 24 is rotating at 200 rpm, then output shaft 20 is rotating at 200 rpm.

Figure 3:
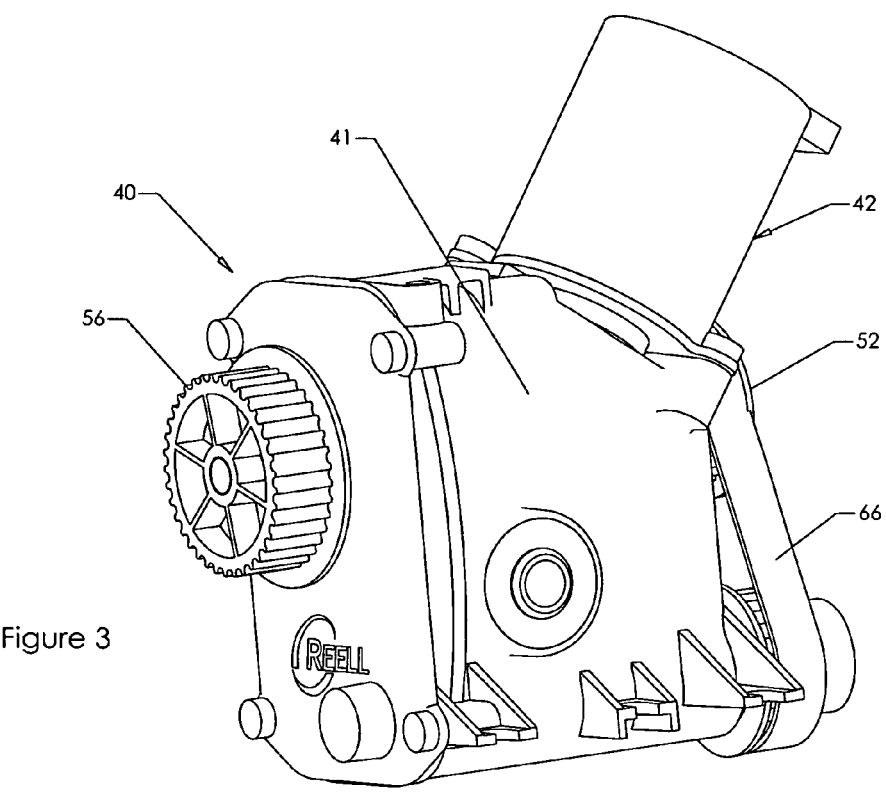
FIG. 3 illustrates an alternative embodiment of a variable speed clutch in accordance with the present invention.
Figure 4:
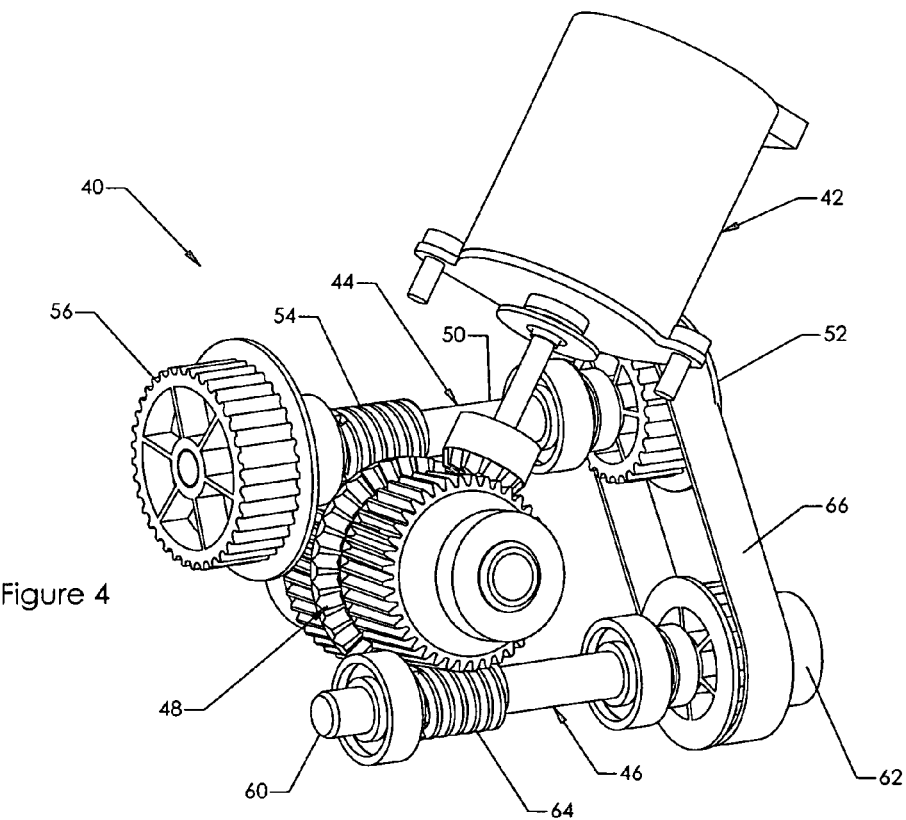
FIG. 4 illustrates the alternative embodiment of a variable speed clutch in accordance with the present invention with a housing removed.

FIGS. 3 and 4 illustrate variable speed clutch 40 in accordance with the present invention. Variable speed clutch 40 includes housing 41, motor assembly 42, first drive assembly 44, second drive assembly 46 and clutch assembly 48. In FIG. 4, housing 41 is removed to more fully view first drive assembly 44, second drive assembly 46 and clutch assembly 48. In operation, first drive assembly 44 is coupled to a source of input rotation such drive shaft of an electrical motor or of an engine. Consequently, first drive assembly 44 is rotated at a speed determined by the motor or engine. First drive assembly 44 is coupled to second drive assembly 46 such that second drive assembly 46 rotates at the same speed as first drive assembly 44. First and second drive assemblies 44 and 46 provide input rotation to the clutch assembly 48. Clutch assembly 48 is further controlled by motor assembly 42 such that the output of clutch assembly 48 rotates at a speed variably controlled by motor assembly 42.

First drive assembly 44 includes first drive shaft 50, first drive pulley 52, first worm gear 54, and rotation source coupler 56. In one embodiment, rotation source coupler 56 is coupled with the drive shaft of an electrical motor. First drive shaft 50 is then coupled to source coupler 56 such that it rotates therewith. First worm gear 54 and first drive pulley 52 are also fixed to first drive shaft 50 such that first worm gear 54, first drive pulley 52 and first drive shaft 50 all rotate together. Second drive assembly 46 includes second drive shaft 60, second drive pulley 62, and second worm gear 64. Second drive pulley 62 is coupled to first drive pulley 52 via belt 66. Second drive pulley 62 and second worm gear 64 are fixed to second drive shaft 60 such that second drive pulley 62, second worm gear 64 and second drive shaft 60 all rotate together.

In operation of variable speed clutch 40, first and second drive assemblies 44 and 46 provide input rotation to clutch assembly 48. Motor assembly 42 is then utilized to control clutch assembly 48 such that the output of clutch assembly 48 can be varied to produce a variety of output conditions. The output may be controlled such that it is stationary, or such that it rotates in either direction, and such that it rotates at a variety of rotational speeds in both directions. The speed and direction of rotation is dependent upon the input rotation from first and second drive assemblies 44 and 46 and upon motor assembly 42.

In one embodiment, housing 41 (shown only in FIG. 3) contains first drive assembly 44, second drive assembly 46 and clutch assembly 48 and is filled with oil or other lubricant. This oil or similar material will aid in drawing heat away form clutch assembly 48 and first and second drive assemblies 44 and 46 as heat is generated by their use. In this way, generated heat is dissipated in the oil contained in housing 41. In other alternative embodiments, clutch assembly 48 and first and second drive assemblies 44 and 46 can be made of materials that are efficient heat conductors and this will help move the generated heat away from the components so that oil may not be needed. Instead, some grease could be used to coat the components.

Figure 5:
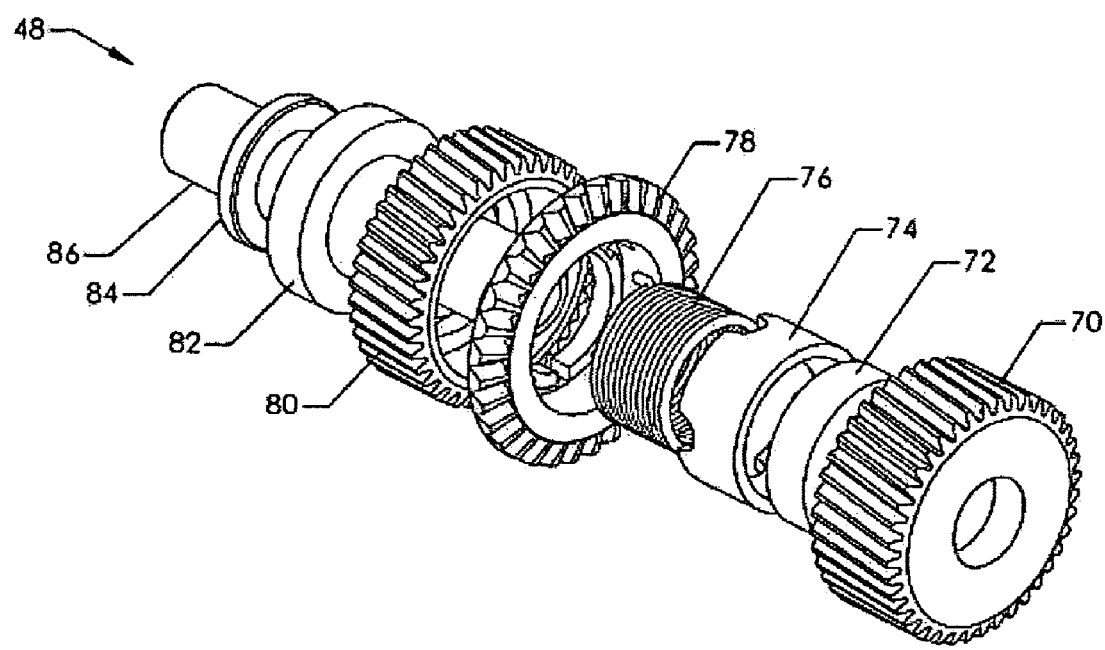
FIG. 5 illustrates an exploded perspective view of a portion of the variable speed clutch in accordance with the present invention.

FIG. 5 illustrates clutch assembly 48 in an exploded view. Clutch assembly 48 includes first input gear 80, first input hub 82, second input gear 70, second input hub 74, output hub 72, wrap spring 76, control ring 78, axial ring 84 and output shaft 86. Clutch assembly 48 receives input rotation from first and second drive assemblies 44 and 46, control rotation from motor assembly 42 and produces a variable speed output rotation of output shaft 86.

Clutch assembly 48 is illustrated in FIG. 5 in an exploded view, but when fully assembled, output shaft 86 extends through second input gear 70, output hub 72, second input hub 74, wrap spring 76, control ring 78, first input gear 80, first input hub 82, and axial ring 84. Axial ring 84 is utilized to hold all the various components on output shaft 86 and prevent axial movement. Wrap spring 76 is concentrically wrapped about output shaft 86 and is configured with a first and second end. The first end of wrap spring 76 is fixed to output hub 72 such that there is no relative rotation between the first end of wrap spring 76 and output hub 72. Output hub 72 is fixed to output shaft 86 such that there is no relative rotation between output hub 72 and output shaft 86.

The second end of wrap spring 76 is fixed to control ring 78. Control ring 78 has a geared face, which engages a geared end of motor assembly 42. In this way, rotation of the geared end of motor assembly 42 rotates control ring 78 about output shaft 86. Since the second end of wrap spring 76 is fixed to control ring 78, rotation of control ring 78 also rotates the second end of wrap spring 78.

Figure 6:
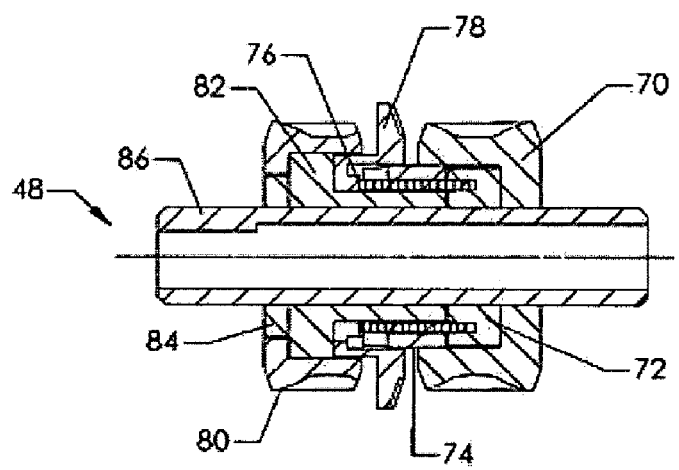
FIG. 6 illustrates a cross-sectional view of a portion of the variable speed clutch in accordance with the present invention.

FIG. 6 illustrates a cross-section of clutch assembly 48 in accordance with the present invention. As illustrated, when clutch assembly 48 is fully assembled, first and second input hubs 82 and 74 partially surround wrap spring 76 such that second input hub 74 is outside wrap spring 76 and first input hub 82 is inside wrap spring 76. When wrap spring 76 is in an equilibrium state, its inner diameter is larger that the outer diameter of first input hub 82 and its outer diameter is smaller than the inner diameter of second input hub 74 such that there is no interference between wrap spring 76 and first and second input hubs 82 and 74 in this state. Both first and second input hubs 82 and 74 rotate freely about output shaft 86.

In operation, first and second drive assemblies 44 and 46 drive the input to clutch assembly 48. More specifically, first worm gear 54 engages first input gear 80 such that first input gear 80 rotates under the control of first drive assembly 44. First input hub 82 is coupled to first input gear 80 such that both first input hub 82 and first input gear 80 rotate under the control of first drive assembly 44. Similarly, second worm gear 64 engages second input gear 70 such that second input gear 70 rotates under the control of second drive assembly 46. Second input hub 74 is coupled to second input gear 70 such that both second input hub 74 and second input gear 70 rotate under the control of second drive assembly 46.

In one embodiment, first and second drive assemblies 44 and 46 are generally perpendicular to clutch assembly 48 and to output shaft 86. When source coupler 56 is coupled with a source of rotation, first drive shaft 50 rotates with the rotation source. In addition, since first and second drive assemblies 44 and 46 are coupled together by belt 66, second drive shaft 60 also rotates with the rotation source in the same direction of rotation. First and second worm gears 54 and 64 are configured to cause first and second input gears 80 and 70 to rotate in opposite directions.

When wrap spring 76 is in its equilibrium state, it will engage neither second input hub 74 nor first input hub 82. In this way, rotation of first and second input hubs 82 and 74 will not cause rotation of wrap spring 76, output hub 72, or output shaft 86, because there is no interference between first or second input hubs 82 or 74 with wrap spring 76. When control ring 78 is rotated, however, wrap spring 76 can be forced out of its equilibrium state such that it will contact either first or second input hubs 82 or 74.

In one embodiment, rotation of control ring 78 in a counter clockwise direction will cause wrap spring 76 to wrap down onto first input hub 82. As wrap spring 76 wraps down on first input hub 82, output shaft 86 will rotate in the direction of rotation of first input hub 82 since wrap spring 76 is fixed to output hub 72, which in turn is fixed to output shaft 86. The rotation of control ring 78 is variably controlled by the rotation of the geared end of motor assembly 42. The speed of rotation of control ring 78 may be variable controlled to variably affect the amount of slippage between wrap spring 76 and first input hub 82. Thus, control ring 78 can be controlled by varying motor assembly 42 to rotate output shaft 86 in a counter clockwise direction at variable speeds. The relative speed of rotation of control ring 78 and first input hub 82 controls the amount of slippage between wrap spring 76 and first input hub 82.

Similarly, motor assembly 42 can also rotate control ring 78 in a clockwise direction. Rotation in this way will cause wrap spring 76 to leave its equilibrium condition and wrap open against second input hub 74. As wrap spring 76 wraps open against second input hub 74, output shaft 86 will rotate in the direction of rotation of second input hub 74 since wrap spring 76 is fixed to output hub 72, which in turn is fixed to output shaft 86. The rotation of control ring 78 is again variably controlled by the rotation of the geared end of motor assembly 42. The speed of rotation of control ring 78 may be variable controlled to variably affect the amount of slippage between wrap spring 76 and second input hub 74. Thus, control ring 78 can be controlled by varying motor assembly 42 to rotate output shaft 86 in a clockwise direction at variable speeds. The relative speed of rotation of control ring 78 and second input hub 74 controls the amount of slippage between wrap spring 76 and second input hub 74. Thus, the speed of rotation of output shaft 86 is a function of the speed of rotation of first or second input drives 44 or 46 (depending on whether first or second input hubs 82 or 74 engages wrap spring 76) and the speed of rotation of control ring 78.

As will be recognized by one skilled in the art, changes may be made in form and detail without departing from the spirit and scope of the invention. For example, first and second worm gears 54 and 64 can be alternatively configured so that first input hub 82 rotates in a counter clockwise direction while second input hub 74 rotates in a clockwise direction or such that first input hub 82 rotates in a clockwise direction while second input hub 74 rotates in a counter clockwise direction. Similarly, wrap spring 76 can be alternatively configured to wrap open as control ring 78 is rotated in a clockwise direction and to wrap down as control ring 78 is rotated in a counter clockwise direction or to wrap open as control ring 78 is rotated in a counter clockwise direction and to wrap down as control ring 78 is rotated in a clockwise direction. Also, first and second input hubs 82 and 74 can be configured to partially surround wrap spring 76 such that first input hub 82 is outside wrap spring 76 and second input hub 74 is inside wrap spring 76. Thus, various combinations are possible for the rotational direction of first and second input hubs 82 and 74, wrap spring 76 and control ring 78.

Variable speed clutches 10 and 40 may be used in a variety of applications to provide favorable results. When a source of input rotation of a given or variable speed is attached to the input of variable speed clutches 10 and 40, the speed of the rotation of the output may be varied from some minimum up to the given or variable input speed by causing slipping of the clutch. The output is controlled independent of the input speed. In this way, the variable speed clutch is conveniently operable to generate a variable output speed. Variable speed clutches 10 and 40 are particularly useful in applications where the energy lost in slipping of the variable speed clutch is not detrimental. Such applications include various motorized mechanisms, such as vacuum cleaners and lawnmowers.

In one embodiment, variable speed clutch 10 is mounted within a lawnmower. The input rotation to clutch 10 is from a drive shaft of an internal combustion engine of the lawnmower. In such an embodiment, the slip rate of clutch 10, and thus the output speed from clutch 10, is controlled by use of a small DC motor. The input of variable speed clutch 10 can be fixed to drive shaft of a typical internal combustion engine used in a lawnmower application. A small DC motor is then coupled to the clutch 10 as speed control motor 22 to variable control the slip rate in clutch 10. The output of clutch 10 is then coupled to the drive mechanism of the lawnmower such that the wheels of the mower are driven by the output from variable speed clutch 10. The DC motor is then configured to be responsive to control signals from an operator of the lawnmower. As the operator sends variable signals to the DC motor indicative of slower and faster speeds desired, the small DC motor responsively controls the slip rate in variable speed clutch 10 thereby varying slippage in clutch 10 and output speed to the wheels of the lawnmower. In this way, the operator variably controls the speed of the lawnmower.

For instance, the handle on the lawnmower may have a lever that controls the speed of speed control motor 22. As the user of the lawnmower pushes the lever in one direction it will increase the speed generated by speed control motor 22 thereby decreasing slippage in variable speed clutch 10 thereby increasing speed of output shaft 20. If output shaft 20 is connected to the drive wheels of the mower, this will increase the speed of the self-propelled mower. Conversely, if the user pushed the lever in an opposite direction, it will decrease the speed of speed control motor 22, thereby increasing the amount of slippage in variable speed clutch 10. This will decrease the speed of output shaft 20 and decrease the speed of the self-propelled mower.

In another embodiment, variable speed clutch 40 is mounted within a vacuum cleaner. The input rotation to clutch 40 is from a drive shaft coupled to the electrical motor of the vacuum cleaner. In such an embodiment, the slip rate of clutch 40, and thus the output speed from clutch 40, is controlled by use of a small DC motor. The vacuum is provided with a lever that controls the speed of the DC motor. The first and second drive assemblies 44 and 46 of variable speed clutch 40 can be fixed to the electrical motor of a typical vacuum cleaner application. The small DC motor is then coupled to the clutch 40 as motor assembly 42 to variable control the slip rate in clutch 40. The output shaft 86 of clutch 40 is then coupled to the drive mechanism of the vacuum cleaner such that the wheels of the vacuum are driven by output shaft 86 of variable speed clutch 40. The DC motor is then configured to be responsive to control signals from an operator of the vacuum. As the operator sends variable signals to the DC motor indicative of slower and faster speeds desired, and of forward and backward directions, the small DC motor responsively controls the direction of rotation of the inputs to variable speed clutch 40, and controls the slip rate in variable speed clutch 40 thereby varying slippage in clutch 40 and output speed to the wheels of the vacuum. In this way, the operator variably controls the speed and direction of the vacuum.

In both the lawn mower and vacuum cleaner applications where wrap spring 17 is normally not engaged with the input hub 16 and wrap spring 76 is normally not engaged with first and second input hubs 82 and 74, the output shafts 20 and 86 can free wheel. In this state, if output shafts 20 and 86 are fixed to wheels that allow the mower and the vacuum to move about, they can be moved without resistance from clutches 10 and 40. If wrap springs 16 and 76 were normally engaged, such ease of movement would not be possible and this would not be desirable in many applications.

Although, the present invention has been described with reference to preferred embodiments, workers skilled in the art will recognize that changes may be made in form and detail without departing from the spirit and scope of the invention.

What is claimed is:

1. A variable speed clutch comprising:
   a source coupler;
   a first input drive coupled to the source coupler and configured to rotate;
   a second input drive configured to rotate;
   an output shaft configured to rotate;
   a first input hub coupled to the first input drive and configured to rotate about the output shaft in a first direction;
   a second input hub coupled to the second input drive and configured to rotate about the output shaft in a second direction opposite the first direction;
   an output hub fixed to the output shaft and configured to rotate therewith;
   a wrap spring having a first and a second end, the first end of the wrap spring fixed to the output hub such that the first end of the wrap spring rotates with rotation of the output hub;
   a control hub coupled to the second end of the wrap spring; and
   a control motor coupled to the control hub, the motor configured to alternatively rotate the control hub, wherein rotation of the control hub in the second direction causes the wrap spring to wrap open thereby engaging the second input hub and wherein rotation of the control hub in the first direction causes the wrap spring to wrap down thereby engaging the first input hub.

2. The variable speed clutch of claim 1 wherein the speed of rotation of the control hub in the second direction is variably controlled by the control motor such that the speed of rotation of the output shaft varies from stationary up to the speed of rotation of the second input driver and wherein the speed of rotation of the control hub in the first direction is variably controlled by the control motor such that the speed of rotation of the output shaft varies from stationary up to the speed of rotation of the first input driver.

3. The variable speed clutch of claim 1 further including a housing enclosing at least the first and second input hubs and the wrap spring, the housing filled with oil such that heat generated by the engagement between the wrap spring and the first and second input hubs is dissipated in the oil.

4. The variable speed clutch of claim 1 wherein the wrap spring is in an equilibrium state when the control motor is stationary such that there is no engagement between the wrap spring and either the first or second hub and such that the output shaft may rotate free from interference from the first and second input drives.

5. The variable speed clutch of claim 1 wherein the control motor is a DC motor.

6. The variable speed clutch of claim 1 wherein an input drive source is coupled to the source coupler, wherein the first input drive is coupled to the second input drive, wherein the first input drive includes a first worm gear configured to drive the first input hub in the first direction and wherein the second input drive includes a second worm gear configured to drive the second hub in the second direction.

7. The variable speed clutch of claim 1 configured within a vacuum cleaner having wheels and a vacuum motor, wherein the source coupler is coupled to the vacuum motor and wherein the output shaft is coupled to the wheels such that speed of rotation of the wheels is variably controlled by the variable speed clutch.

8. The variable speed clutch of claim 7 configured such that the vacuum cleaner wheels are free when the control motor is stationary such that the vacuum cleaner may be freely moved by a user on its wheels, and configured such that the vacuum cleaner wheels are rotated by the vacuum motor when the control motor is rotating such that the vacuum cleaner is moved by its own power.

9. The variable speed clutch of claim 1 configured within a lawnmower having wheels and a lawnmower engine, wherein the source coupler is coupled to the lawnmower engine and wherein the output shaft is coupled to the wheels such that speed of rotation of the wheels is variably controlled by the variable speed clutch.

10. The variable speed clutch of claim 1 wherein the second input hub is an outer cylindrical hub configured to surround the wrap spring and wherein the first input hub is an inner cylindrical hub configured within the wrap spring.

11. The variable speed clutch of claim 1 wherein the first input hub is an outer cylindrical hub configured to surround the wrap spring and wherein the second input hub is an inner cylindrical hub configured within the wrap spring.

12. A variable speed clutch comprising:
an output shaft having an axis of rotation;
a first input hub coupled to an input rotation source and thereby configured to rotate in a first direction about the output shaft;
a second input hub coupled to the input rotation source and thereby configured to rotate in a second direction, opposite the first direction, about the output shaft;
an output hub fixed to the output shaft and configured to rotate therewith;
a wrap spring having a first and a second end, the first end of the wrap spring fixed to the output hub such that the first end of the wrap spring rotates with rotation of the output hub;
a control hub coupled to the second end of the wrap spring and configured to alternatively rotate, such that rotation of the control hub in the second direction causes the wrap spring to wrap open thereby engaging the second input hub and such that rotation of the control hub in the first direction causes the wrap spring to wrap down thereby engaging the first input hub; and
wherein the speed of rotation of the control hub in the second direction is variably controllable such that the speed of rotation of the output shaft varies from stationary to the speed of rotation of the input rotation source and wherein the speed of rotation of the control hub in the first direction is variably controllable such that the speed of rotation of the output shaft varies from stationary to the speed of rotation of the input rotation source.

13. The variable speed clutch of claim 12 wherein the input rotation source comprises first input drive coupled to the first input hub and a second input drive coupled to the second input hub, wherein the first input drive causes the first input hub to rotate in the first direction about the output shaft and wherein the second input drive causes the second input hub to rotate in the second direction about the output shaft.

14. The variable speed clutch of claim 12 wherein the control hub engages a variable speed control motor and wherein the speed and direction of rotation of the control hub is controlled by the variable speed control motor.

15. The variable speed clutch of claim 12 further including a housing enclosing at least the first and second input hubs and the wrap spring, the housing filled with oil such that heat generated by the engagement between the wrap spring and the first and second input hubs is dissipated in the oil.

16. The variable speed clutch of claim 14 wherein the wrap spring is in an equilibrium state when the control motor is stationary such that there is no engagement between the wrap spring and either the first or second hub in the equilibrium state such that the output shaft may rotate free from interference from the first and second input drives.

17. The variable speed clutch of claim 14 configured such that the variable speed clutch is mounted within a vacuum cleaner having and vacuum motor and wheels, wherein a drive shaft rotated by the vacuum cleaner motor is coupled to the first and second input drives and wherein the output shaft is coupled to the wheels of the vacuum cleaner such that by variably controlling the speed of the variable speed control motor, the vacuum cleaner is moved on its wheels at variable speeds.

18. The variable speed clutch of claim 13 wherein the first and second input drives are generally parallel to each other and wherein the first and second input drives are generally perpendicular to the output shaft.

19. A variable speed clutch comprising:
an output shaft having an axis of rotation;
a first input hub coupled to a first input rotation source and thereby configured to rotate in a first direction about the output shaft;
a second input hub coupled to a second input rotation source and thereby configured to rotate in a second direction, opposite the first direction, about the output shaft;
an output hub fixed to the output shaft and configured to rotate therewith;
a wrap spring having a first and a second end, the first end of the wrap spring fixed to the output hub such that the first end of the wrap spring rotates with rotation of the output hub; and
means coupled to the second end of the wrap spring for alternatively causing the wrap spring to wrap open a variable amount thereby engaging the second input hub by a variable amount and for causing the wrap spring to wrap down a variable amount thereby engaging the first input hub by a variable amount.

20. The variable speed clutch of claim 19 wherein the first and second input rotation sources are first and second input drives that are generally parallel to each other and that are generally perpendicular to the output shaft.

21. The variable speed clutch of claim 19 wherein the first input hub is an outer cylindrical hub configured to surround the wrap spring and wherein the first input hub is an inner cylindrical hub configured within the wrap spring.

* * * * *